United States Patent [19]
Seidman et al.

[11] 3,971,942
[45] July 27, 1976

[54] GAMMA-RAY CAMERA INCLUDING NOVEL CONVERTER MATRIX USEFUL THEREIN

[75] Inventors: Ady Seidman, Tel Aviv; Zohar Avrahami, Ramat Gan; Benjamin Sheinfux, Tel Aviv; Jan Grinberg, Holon; Uri Shimoni, Kiron, all of Israel

[73] Assignee: Ramot University Authority for Applied Research and Industrial Development Ltd., Tel Aviv, Israel

[22] Filed: Sept. 5, 1974

[21] Appl. No.: 503,284

[30] Foreign Application Priority Data
Sept. 5, 1973 Israel.................................. 43166

[52] U.S. Cl.............................. 250/363 S; 250/369
[51] Int. Cl.²............................................ G01T 1/20
[58] Field of Search............. 250/213 VT, 369, 367, 250/366, 385, 336, 393, 394, 395

[56] References Cited
UNITED STATES PATENTS

| | | |
|---|---|---|
| 3,235,737 | 2/1966 | Niklas............................. 250/367 X |
| 3,509,341 | 4/1970 | Hindel et al......................... 250/366 |
| 3,626,189 | 12/1971 | Berg.................................. 250/385 |
| 3,683,185 | 8/1972 | Muehllehner............ 250/213 VT X |
| 3,703,638 | 11/1972 | Allemand et al................... 250/385 |
| 3,838,273 | 9/1974 | Cusano......................... 250/213 VT |
| 3,857,036 | 12/1974 | Novak................................. 250/367 |

*Primary Examiner*—Davis L. Willis
*Attorney, Agent, or Firm*—Benjamin J. Barish

[57] ABSTRACT

A gamma-ray camera is described including a collimator receiving and collimating the gamma rays, a converter matrix converting the gamma rays to electrons, an electron-image multiplier receiving the electrons and producing a multiplied electron output, and means for reading out the output of the electron-image multiplier.

A converter matrix is described for converting gamma-rays to electrons comprising a metal plate emitting electrons upon being impinged by gamma-photons, the metal plate having a face formed with a plurality of spaced parallel surfaces which extend substantially parallel to the direction of the gamma-rays. Also described is a converter matrix of scintillation crystals, one face of each crystal including a photo-sensitive coating, the opposite face of each crystal being clear, the remaining faces of each crystal being coated with a light-reflecting coating.

19 Claims, 9 Drawing Figures

GAMMA-RAY CAMERA INCLUDING NOVEL CONVERTER MATRIX USEFUL THEREIN

BACKGROUND OF THE INVENTION

This invention relates broadly to radiation imaging devices which permit the direct recording of the distribution of radioactive material from a radiating source, such as a human organ. The invention is directed particularly to a novel gamma-ray camera and to several components used in such camera.

Visualization of isotope distribution within the living body has created important medical diagnostic procedures during the last decade. The two instruments which dominate the field of radioisotope imaging are the rectilinear scanner and the gamma-ray camera. The gamma camera, now being used to visualize nearly all organs that can be seen by conventional radioisotope scanners, has proved superior to these instruments in many ways in the field of basic research and clinical diagnosis and research.

Although the scanners can yield good picture definition, they are useless for studies of isotopes in motion (dynamic studies), for which exposures as little as 1 sec. may be derived to capture the changing distribution. The static camera, which has no moving parts and whose scintillation crystal must therefore be of large diameter so as to view the whole organ, appears to offer the only immediate solution. However, the static camera still remains equally useful for stationary distributions.

Attempts have been made to build a static camera around an image-intensifier as early as 1950, but such attempts were abandoned because prohibitively large isotope doses were needed to mask the fogging effects of intensifier tube noise on the picture. Several workers then turned to cameras using a multiplicity of photomultipliers to view the phosphor. Two instruments of this type are in current use, but their picture definition is limited. In one camera, at least, the maximum count rate is not really high enough for the dynamic studies.

The image-intensifier solution has been a continuous source of fascination, and designs have been proposed or built by a number of others. They all possess shortcomings, such as complex electronic systems, resulting in a large cost, and the necessity of continuous adjustments by a trained technician. Other disadvantages of prior devices are the long time interval required to obtain the radiation distribution data; the inability to obtain temporal information about the radiation distribution; the limitation on resolution made by the converting system and the collimator; and the limitation on the energy of the isotope used.

SUMMARY OF THE INVENTION

According to a broad aspect of the present invention, there is provided a gamma-ray camera characterized in that it includes a collimator receiving and collimating the gamma rays; a converter matrix converting the gamma rays to electrons; an electron-image multiplier receiving the electrons and producing a multiplied electron output; and means for reading-out the output of the electron-image multiplier.

By "electron-image multiplier" is meant a device which receives an electron image and produces therefrom a corresponding electron image but with a multiplied electron output or an increased contrast, preferred examples being multi-channel and gas avalanche electron multipliers.

Embodiments of the invention are described below in which the converter matrix is both of the metal type and of the scintillation crystal type.

According to another feature of the invention, a metal converter matrix is provided including a metal plate having a face formed with a plurality of spaced parallel surfaces extending substantially parallel to the direction the gamma rays exist from the collimator.

These spaced parallel surfaces may be defined by a plurality of parallel grooves formed in the one face of the metal plate, or a plurality of parallel openings formed through the metal plates.

According to another feature, the spaced parallel surfaces of the metal plate are formed of a plurality of layers of low-resistive material each alternating with a layer of high-resistive material, the walls of said spaced parallel surfaces being coated with a secondary-emission resistive coating, the camera including means for applying a stepped voltage gradient to the low-resistive layers.

According to a further feature of the invention, there is provided a combined converter matrix and electron-image multiplier including a plurality of pairs of layers superimposed one over the other in the direction the gamma rays exit from the collimator, each pair of layers including one layer comprising a plurality of thin cathode strips extending in parallel along one orthogonal axis and a second layer comprising a plurality of thin anode strips extending in parallel along the other orthogonal axis, an enclosure enclosing said plurality of pairs of superimposed layers, and an ionizable gas within the enclosure.

According to a still further feature, the invention provides a matrix of scintillation crystals, one face of each crystal including a photo-sensitive coating, the opposite face of each crystal being clear, the remaining faces of each crystal being coated with a light-reflecting coating.

Further features of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
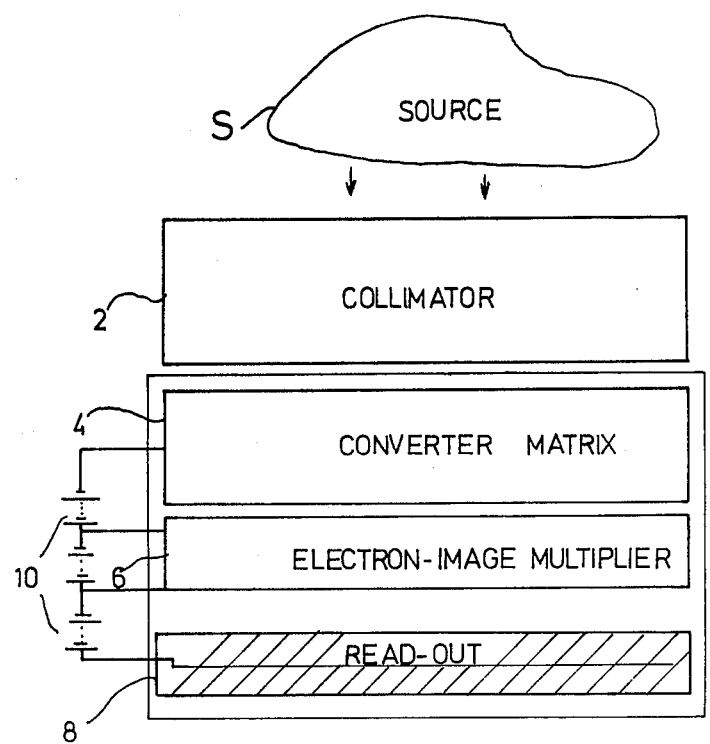
FIG. 1 is a diagram illustrating one form of gamma-ray camera constructed in accordance with the invention.

FIG. 1 illustrates in block form the main components of the novel gamma-ray camera constructed in accordance with the invention. The camera includes a collimator 2 receiving and collimating the gamma rays from the source S, a converter matrix 4 converting the gamma rays to electrons, an electron-image multiplier 6 receiving the electrons and producing a multiplied electron output, and a read-out 8 which collects the electrons from multiplier 6 and provides an electrical read-out thereof. The collimator 2 is of conventional construction well-known in the art, and is therefore not described more particularly below. Different constructions and arrangements may be used for the remaining components, and several of these constructions and arrangements are described below.

Figure 9:
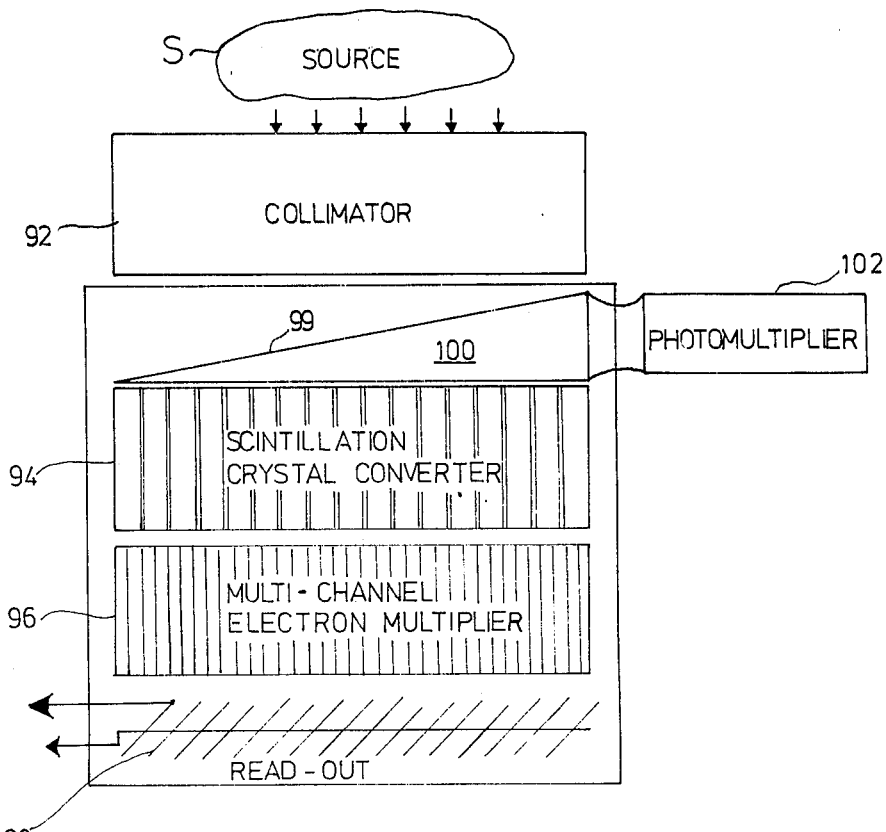
FIG. 9 illustrates a further form of gamma-ray camera constructed in accordance with the invention.
Figure 7:
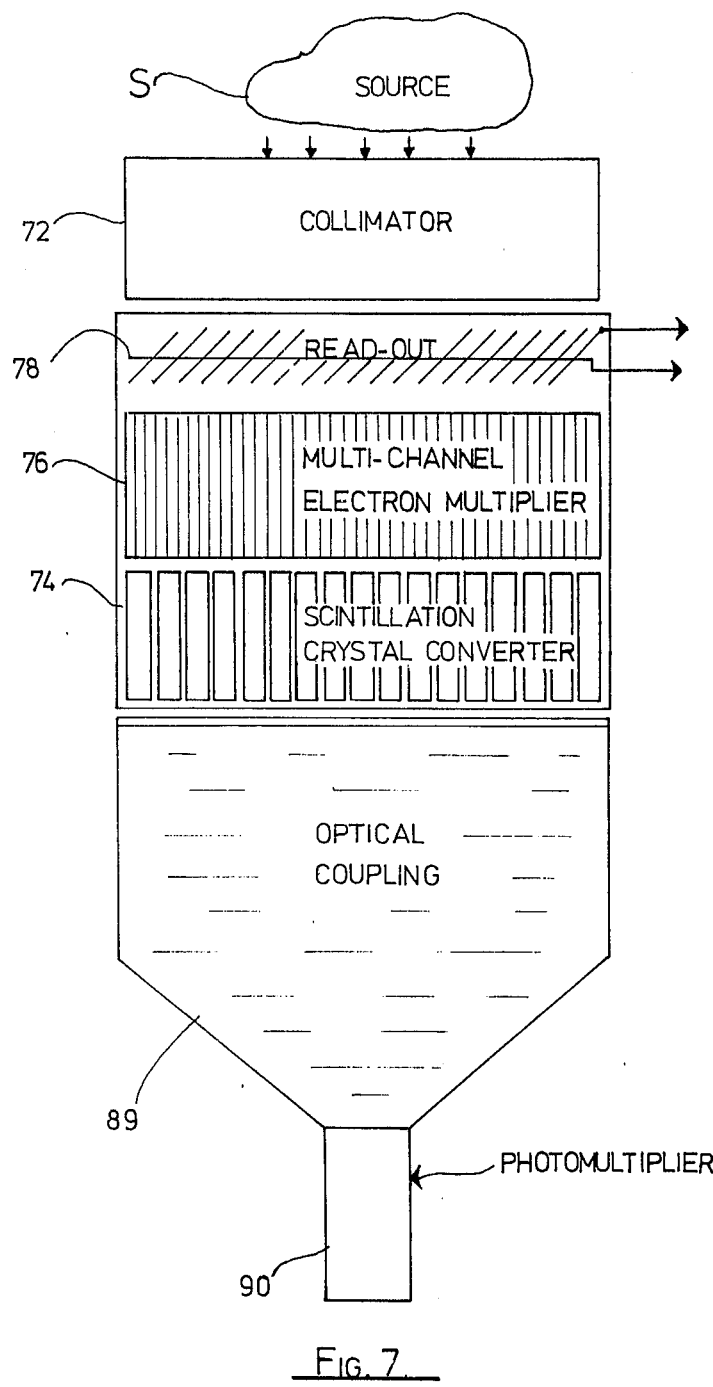
FIG. 7 illustrates another form of gamma-ray camera constructed in accordance with the invention.
Figure 8:
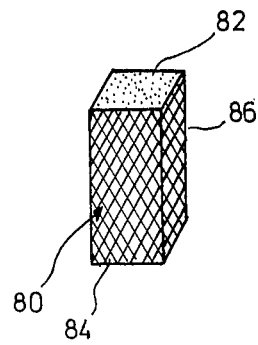
FIG. 8 illustrates one of the crystals in the scintillation crystal matrix of the camera of FIG. 7.

The converter matrix 4, which converts the gamma rays from the collimator to electrons, may be a metal matrix converter or a scintillation crystal converter, for example. FIGS. 2–6 illustrate different forms of metal converters that may be used, and FIGS. 7–9 illustrate the camera including scintillation crystal converters.

The converters illustrated in FIGS. 2–5 are constructed so that the gamma-photons irradiate the converter in a direction substantially parallel to the effective layer of the converter, rather than perpendicularly to that layer. For this purpose, the metal converter matrix includes a metal plate having a face formed with a plurality of spaced parallel surfaces which extend substantially parallel to the direction the gamma rays exit from the collimator. Thus, high absorption efficiency of the gamma-photons is achieved, and because of the angular distribution of the photo-electrons, high probability of emission is obtained, thereby resulting in improved conversion efficiency.

Figure 2:
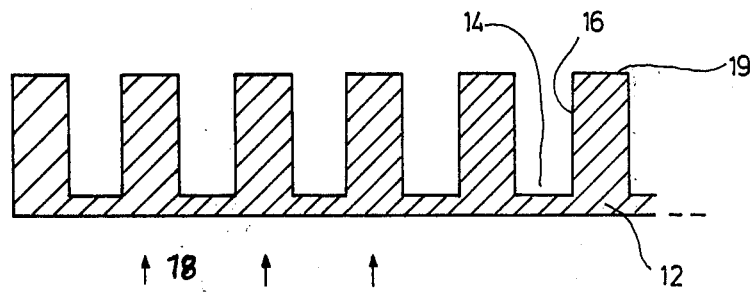
FIGS. 2–5 illustrate different types of metal converter matrices which may be used in the camera of FIG. 1.

FIG. 2 illustrates one such form of metal converter matrix, including a metal plate 12 formed on one face with a plurality of parallel grooves 14, the latter defining the plurality of spaced parallel surfaces 16 extending substantially parallel to the direction the gamma rays exit from the collimator, as shown by arrows 18. The converter is made of a metal which has the characteristics of emitting electrons upon being impinged by gamma-photons. The parallel grooves 14 are spaced about 30–200 microns apart. A gamma-photon absorbed in a rib 19 defined by grooves 14 causes an electron to be ejected due to the photo-electric effect. The angular distribution of a photo-electron is in the range of 20° to 80° (for energies between 100 and 500 KeV), and therefore the photo-electron has a high probability of emission into the groove 14. The width of the plate is calculated so that the gamma-photon is absorbed in the ribs 19 with high efficiency.

As one example, the metal plate may be lead or aluminium, the width of grooves 14 may be 100–200 microns, the width of ribs 19 may be about 100 microns, and the total thickness of the plate (for example for 90% absorption of 500 KeV gamma-photons) may be about 3 mm. of lead.

Figure 3:
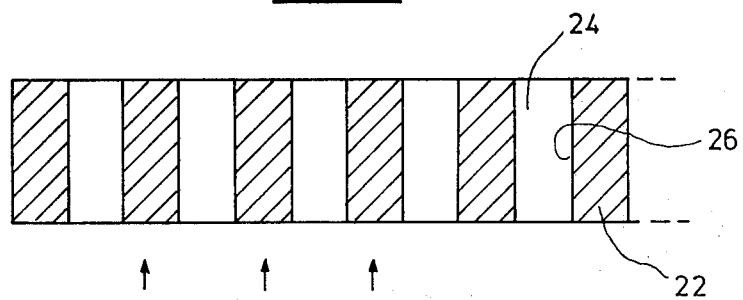

FIG. 3 illustrates a similar form of metal converter matrix, in which the surfaces in the metal plate 22 extending substantially parallel to the direction the gamma rays exit from the collimator are formed by a plurality of spaced parallel openings 24 formed through the metal plate. Openings 24 define the parallel surfaces 26 corresponding to surfaces 16 in FIG. 2.

An an example of a FIG. 3 embodiment, the metal may be lead or aluminium, the diameter of holes 24 may be about 0.5 mm, the distance between the centers of the holes may be about 1 mm, and the total thickness of a plate of lead may be about 3 mm for 90% absorption of 500 KeV gamma-photons.

Figure 4:
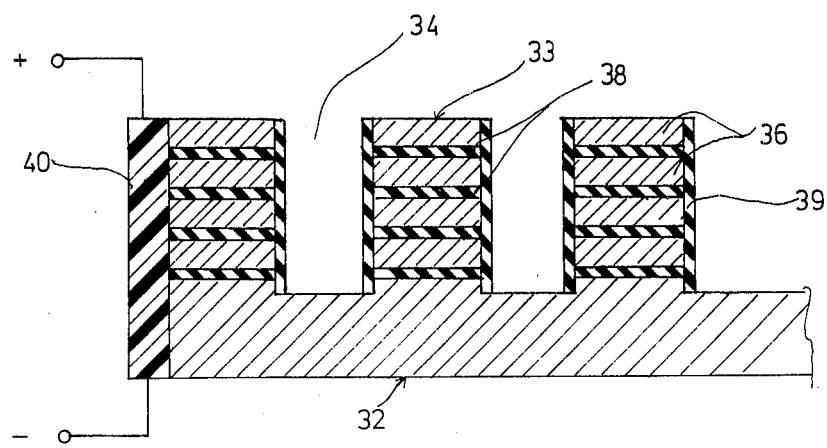
Figure 5:
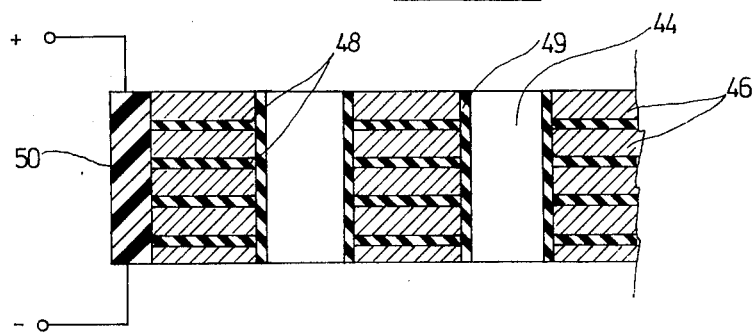

FIGS. 4 and 5 illustrate metal converter matrices corresponding to the structures of FIGS. 2 and 3, respectively, but modified so as to provide not only conversion of the gamma rays to electrons, but also multiplication of the electrons. The manner in which electron multiplication is obtained is described in co-pending application No. 480,683, filed June 17, 1974 relating to a novel multiple-channel electron multiplier. Briefly, the spaced parallel surfaces of the converter (corresponding to surfaces 16 and 26 in FIGS. 2 and 3, respectively) are formed of a plurality of layers of (electrically-conductive) material each alternating with a layer of (electrically-conductive) material. In addition, these surfaces are coated with a secondary-emission resistive coating. Further, the camera includes means for applying a stepped electric voltage gradient to the low-resistivity layers.

In FIG. 4, there is shown the converter plate 32 having a plurality of parallel ribs 33 defined by a plurality of grooves 34 corresponding to grooves 14 in FIG. 2. However, in FIG. 4 the grooves are built-up of a plurality of layers of low-resistivity material 36 each alternating with a layer of high-resistivity material 38. The walls of the so-formed grooves are coated with a secondary-emission resistant coating 39. The stepped voltage gradient is applied to the low-resistivity layers 36 by means of a voltage-dividing member 40 of high-resistivity material connected to a source of voltage and contacting successively the low-resistivity layers 36.

The impingement of a gamma-photon on a rib 33 causes the emission of electrons from that rib. These electrons are accellerated by the electrical field produced by the stepped voltage applied to the low-resistivity layers 36, causing the electrons to impinge on the secondary-emission coating 39, resulting in the multiplication of the originally-produced electrons. Further details of the construction and operation of such a multi-channel electron multiplier are available from the above-referenced co-pending application.

FIG. 5 illustrates a metal converter matrix similar to that of FIG. 4, except the surfaces parallel to the direction of the gamma-photons are formed by a plurality of openings through the converter plate, as in FIG. 3. In this case, as in FIG. 4, multiplication of the electrons is produced by providing a plurality of low-resistivity layers 46 each alternating with a high-resistivity layer 48, the walls of the openings also being coated with a secondary-emission resistive layer 49. Also as in FIG. 4, a stepped voltage gradient to the low-resistivity layers 46 is provided by a voltage-dividing high-resistivity member 50 successively contacting the low-resistivity layers.

For purposes of example, the converter plate in both FIGS. 4 and 5 may be of lead or aluminium; the low resistivity layers 36, 46 may be of the same metal; and the high-resistivity layers 38, 48, and the secondary emission coatings 39, 49, may all be made of lead oxide or aluminium oxide. The voltage dividing resistive member 50 may be made of carbon vapor deposits or a cermet composition. The thickness of each low-resistivity layer may be about 0.1 – 0.2 mm, and thickness of each high-resistivity layer may be about 50 micrometers. The voltage gradient between the low-resistivity layers, i.e., from one to the next, may be about 50 volts.

Figure 6:
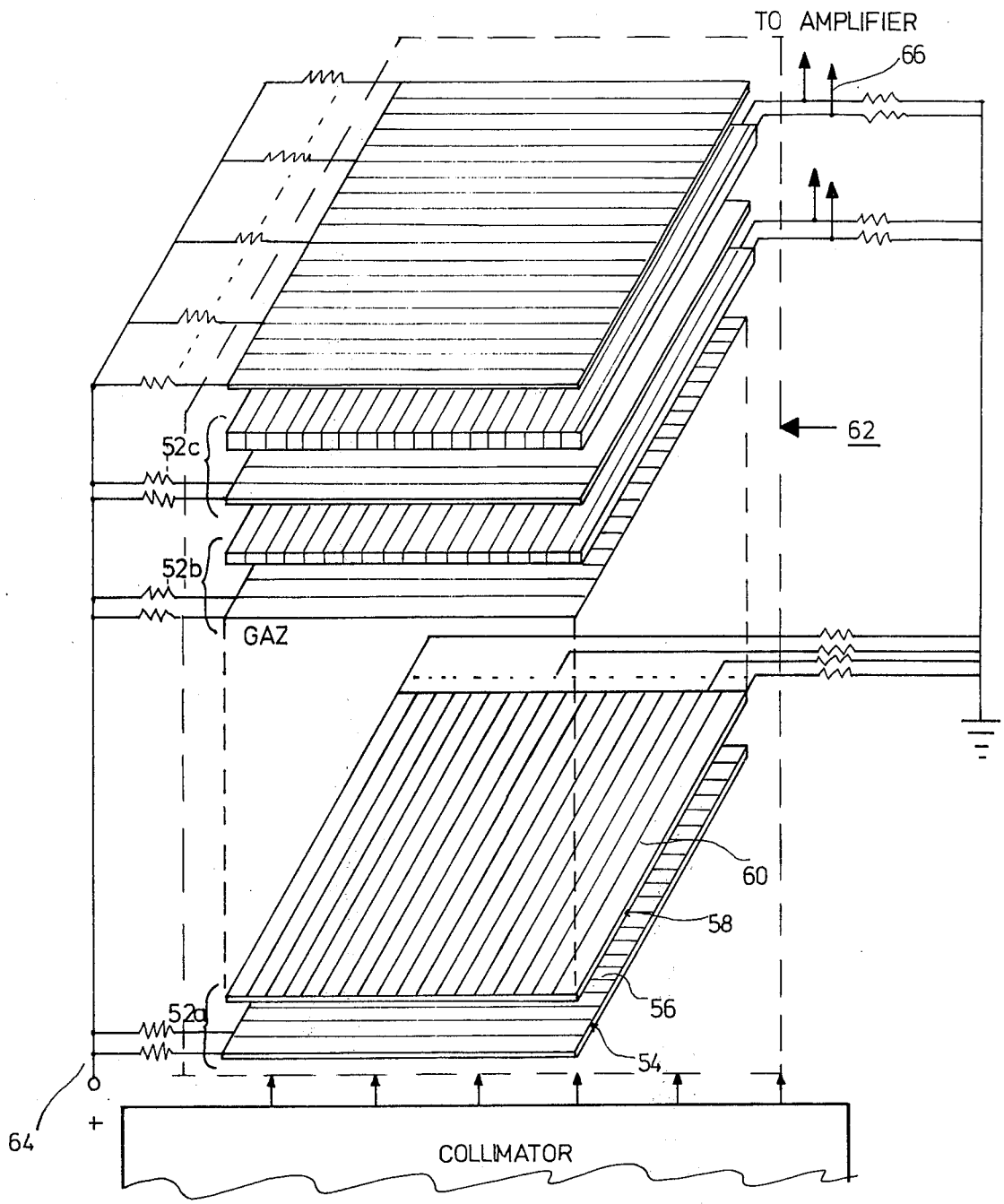
FIG. 6 illustrates a combined converter matrix and electron-image multiplier which may be used in the camera of FIG. 1.

FIG. 6 illustrates a device which can be used as a combined converter matrix and electron-image multiplier. The device of FIG. 6 includes a plurality of pairs of layers, e.g. 52a, 52b, 52c, superimposed one over the other in the direction of propagation of the gamma rays from the collimator. Each pair of layers includes one layer (the one on the side facing the collimator, e.g. layer 54 of pair 52a) which comprises a plurality of thin anode strips 56 extending in parallel along one orthogonal axis. The layer remote from the collimator in each pair, (layer 58 in pair 52a) comprises a plurality thin cathode strips 60 extending in parallel along the other orthogonal axis, that is at right angles to the anode strips. The anode strips 56 may be made of thin copper, and the cathode strip 60 may be of thin lead. The thicknesses of the cathode layers 56 increase in the direction away from the collimator in order to diminish the total number of layers required to absorb the gamma-photons with high probability. The device is enclosed within an enclosure, schematically indicated by broken line 62, which enclosure is filled with an ionizable gas to enable multiplication by the ionization effect.

The gamma-photons absorbed in the converter cathode strips 60 cause photo-electrons to be emitted into the space between the layers. These photo-electrons are accellerated by a high voltage applied by voltage source 64, and initiate an avalanche in the gas within the enclosure, resulting in the multiplication of the electrons. Electrical conductors 66 are connected to the individual cathode strips 60 and provide a read-out of the electrons collected by the respective anodes.

A rough estimation of the photo-energy may be obtained by determining the Z-position (i.e., the vertical position in the stack) of the cathodes strip absorbing the gamma-photons involved.

As one example, each cathode strip may have a thickness of about 60–400 microns and a width of about 0.5 centimeters. The spacing between each cathode-anode pair may be about 1 centimeter. The total thickness of all the cathodes would be determined by the needed absorption; for example, for 90% absorption of 500 KeV photons, a total thickness of lead cathodes of about 3 mm is needed. For the energy range of up to 500 KeV, there would be about 80 strips.

FIG. 7 illustrates a gamma-ray camera wherein the converter matrix comprises a matrix of scintillation crystals 74 each including a photo-sensitive layer which produces an electron output. In the arrangement of FIG. 7, the electron-image multiplier 76 and read-out 78 are both disposed between the collimator 72 and the converter matrix 74. In this case, the electron-image multiplier 76 is preferably of the multiple-channel plate type including holes through which the gamma-photons pass from source S and collimator 72, before being intercepted by the scintillation crystal converter matrix 74.

The latter matrix includes a plurality of scintillation crystals, one of which is shown at 80 in FIG. 8, having a photo-sensitive coating 82 on its top face and being clear on its bottom face 84. The remaining sides of the crystal are coated with a reflecting coating 86. The gamma-photons from the source are converted to light photons in the crystals, some of the light photons impinging on the photo-sensitive coating 82 and being converted to electrons, and other light photons passing through the crystal. The electrons emitted by the photo-sensitive coating 82 pass through the multiple-channel converter plate 76 (e.g. of the type described in Patent application No. 480,683, filed June 17, 1974)which multiplies them, and the multiplied output is read-out by the wire-grid read-out 78. The light photons produced in the crystals continue through an optical coupling 89 to a photo-multiplier 90, whose output indicates the energy of the gamma photons.

FIG. 9 illustrates a further arrangement that may be used for the gamma-ray camera. In FIG. 9 the gamma-photons from source S pass from collimator 92 through a scintillation crystal matrix 94 which converts the gamma-photons to electrons and light photons. The electrons are multiplied in a multiple-channel electron multiplier 96 and read-out by a wire-grid read-out 98. The light photons are reflected by layer 99 and are transmitted via optical coupling 100 to a photo-multiplier 102.

Many other variations, modifications, and applications of the described gamma-ray camera, and the novel components used in such camera, will be apparent.

What is claimed is:

1. A gamma-ray camera characterized in that it includes a collimator receiving and collimating the gamma rays; a metal converter matrix converting the gamma rays to electrons; said metal converter matrix including a metal plate having a face formed with a plurality of spaced parallel surfaces extending substantially parallel to the direction the gamma rays exit from the collimator; an electron-image multiplier receiving the electrons and producing a multiplied electron output; and means for reading-out the output of the electron-image multiplier.

2. A camera according to claim 1, wherein said plurality of spaced parallel surfaces are defined by a plurality of parallel grooves formed in the said face of the metal plate.

3. A camera according to claim 1, wherein said plurality of spaced parallel surfaces are defined by a plurality of parallel openings formed through the metal plate.

4. A camera according to claim 1, wherein the metal plate is of lead, and the plurality of parallel surfaces thereof are spaced from each other about 30 to 200 microns.

5. A camera according to claim 1, wherein the spaced parallel surfaces of the metal plate are formed of a plurality of layers of low-resistive material each alternating with a layer of high-resistive material, said spaced parallel surfaces being coated with a secondary-emission resistive coating, the camera including means for applying a stepped voltage gradient to the low-resistive layers.

6. A camera according to claim 1, wherein the electron-image multiplier and read-out are both disposed on the side of the converter matrix opposite to the collimator.

7. A camera according to claim 1, wherein the electron-image multiplier and read-out are both disposed between the collimator and the converter matrix.

8. A gamma-ray camera characterized in that it includes a collimator receiving and collimating the gamma rays; a converter matrix converting the gamma rays to electrons; an electron-image multiplier receiving the electrons and producing a multiplied electron output; and means for reading-out the output of the electron-image mutiplier, wherein the converter matrix and electron-image multiplier are constituted of a plurality of pairs of layers superimposed one over the other in the direction the gamma-rays exit from the collimator, each pair of layers including one layer comprising a plurality of thin cathode strips extending in parallel along one orthogonal axis and a second layer comprising a plurality of thin anode strips extending in parallel along the other orthogonal axis, an enclosure enclosing said plurality of pairs of superimposed layers, and an ionizable gas within the enclosure.

9. A camera according to claim 8, wherein the thickness of the cathode strips increases in the direction away from the collimator.

10. A gamma-ray camera characterized in that it includes a collimator receiving and collimating the gamma rays; a converter matrix converting the gamma rays to electrons; an electron-image multiplier receiving the electrons and producing a multiplied electron output; and means for reading-out the output of the electron-image multiplier, wherein the converter matrix comprises a matrix of scintillation crystals each including on one face a photo-sensitive layer which produces an electron output, the opposite face of each crystal being clear, the remaining faces of each crystal being coated with a light-reflecting coating.

11. A camera according to claim 10, further including a photo-multiplier disposed on the side of the scintillation crystal matrix opposite to the collimator to receive light photons from the latter matrix, the electron-image multiplier being disposed between the scintillation crystal matrix and the collimator.

12. A camera according to claim 10, further including a photo-multiplier disposed between the collimator and the scintillation crystal matrix to receive light photons from the latter matrix, the electron-image multiplier being disposed on the opposite side of the matrix.

13. A gamma-ray camera according to claim 10, wherein one face of each crystal of the matrix includes a photo-sensitive coating, the opposite face being clear, the remaining faces being coated with a light-reflecting coating.

14. A converter matrix for converting gamma-rays to electrons, comprising a metal plate having the characteristic of emitting electrons upon being impinged by gamma-photons, said metal plate having a face formed with a plurality of spaced parallel surfaces which extend substantially parallel to the direction of the gamma-rays.

15. A converter matrix according to claim 14, wherein said plurality of spaced parallel surfaces are defined by a plurality of parallel grooves formed in the face of the metal plate.

16. A converter according to claim 14, wherein said plurality of spaced parallel surfaces are defined by a plurality of parallel openings formed through the metal plate.

17. A converter according to claim 14, wherein the metal plate is lead, and the plurality of parallel surfaces thereof are spaced from each other about 30 to 200 microns.

18. A converter according to claim 14, wherein the spaced parallel surfaces of the metal plate are formed of a plurality of layers of low-resistive material each alternating with a layer of high-resistive material, said spaced parallel surfaces being coated with a secondary-emission resistive coating, the converter including means for applying a stepped voltage gradient to the low-resistive layers.

19. A converter matrix comprising a matrix of scintillation crystals, one face of each crystal including a photo-sensitive coating, the opposite face of each crystal being clear, the remaining faces of each crystal being coated with a light-reflecting coating.

* * * * *